United States Patent [19]

McIntosh et al.

[11] 4,287,930

[45] Sep. 8, 1981

[54] TIRE AND METHOD OF REINFORCEMENT

[75] Inventors: Kenneth W. McIntosh, Cuyahoga Falls, Ohio; Edward B. Colby, Jr., Audubon, Pa.

[73] Assignee: The Goodyear Tire & Rubber Company, Akron, Ohio

[21] Appl. No.: 139,412

[22] Filed: Apr. 11, 1980

[51] Int. Cl.³ ............................................. B60C 9/02
[52] U.S. Cl. ............................... 152/357 R; 152/358; 152/361 R; 156/125; 264/501; 264/326; 264/279.1
[58] Field of Search ........... 152/330 R, 354 R, 357 R, 152/358, 361; 264/501, 250, 257, 258, 261, 262, 271, 275, 326; 156/123, 125, 133

[56] References Cited

U.S. PATENT DOCUMENTS

| | | | |
|---|---|---|---|
| 3,183,135 | 5/1965 | Berquist | 156/126 |
| 3,315,283 | 4/1967 | Larsen | 428/255 |
| 3,458,373 | 7/1969 | Knipp et al. | 156/125 |
| 3,701,374 | 10/1972 | McGillvary | 152/330 R |
| 3,888,291 | 6/1975 | Herzlich et al. | 152/330 R |
| 3,956,448 | 5/1976 | Larson | 264/138 |
| 3,975,490 | 8/1976 | Lapeyre | 264/271 |
| 4,049,767 | 9/1927 | Vaidya | 264/257 |

*Primary Examiner*—John E. Kittle
*Attorney, Agent, or Firm*—Frederick K. Lacher; H. C. Young, Jr.

[57] ABSTRACT

A cast or injection molded tire having a reinforcing sheet of netting material providing openings for striking through of elastomeric material during filling of the mold. The process of making the tire includes shaping the sheet of netting material by stretching and thereby orienting the strands. The shaping is done at elevated temperatures and then the netting material cooled in the shaped form. A mat of overlapping sheets of netting material may be used with the strands being multidirectional to provide uniform sidewall strength. An overlapping breaker ply of netting material may also be used to connect two mats of reinforcing sheets on opposite sides of the tire.

28 Claims, 8 Drawing Figures

TIRE AND METHOD OF REINFORCEMENT

This invention relates generally to reinforcement of tires of elastomeric material and especially to reinforcement of tires made by pouring or injection of a liquid reaction mixture of elastomer forming material into a mold. It has been the practice to build fabric plies into tires for reinforcing the tires after cure. This has been difficult to do with tires made by pouring or injection of a liquid elastomer forming material because the movement of the liquid reaction mixture through the mold has caused transporting of the reinforcing strands during the molding process.

It has been proposed to injection mold a tire half containing a reinforcing member with a contour adapted to conform to the shape of the tire half to be cast or molded. The reinforcement is braided from organic or inorganic "wire" or from thermoplastic synthetic resins by processes such as injection molding. In this process, the reinforcing means is provided with an adhesive to promote adhesion between the reinforcing means and the elastomer to be molded around it. After the tire halves have been molded around the reinforcing means, the halves are joined together by adhesion or welding. As indicated, there is a problem in adhering the reinforcing member to the elastomer molded around it and it is also evident that if the weld at the junction of the two halves is not properly made, the tire will fail.

The present invention is directed to a tire construction in which the reinforcement is provided by a plurality of overlapping sheets of netting material having openings for striking through of the elastomeric material during filling of the mold to encapsulate the strands of the netting material. The overlapping sheets of netting material are preshaped to the shape of one-half a torus for reinforcing the sidewall and one-half the crown of the tire and oriented so that the strands of the netting material are multidirectional and provide uniform sidewall strength. An overlapping breaker ply of netting material may also be used to connect or abridge the reinforcing sheets on opposite sides of the tire.

In accordance with one aspect of the invention, there is provided a tire of the type which is cast or injection molded comprising an annular body of elastomeric material having a U-shaped cross section, a pair of radially inner edges of said body, a crown portion, a pair of sidewalls extending radially outward from said inner edges and connected to said crown portion, overlapping, multidirectional reinforcing strands positioned in at least one of said sidewalls to define openings between said strands for striking through of elastomer forming material during molding to provide encapsulation of said strands and interlocking with said annular body.

In accordance with another aspect of the invention, there is provided a process for reinforcing a tire with a plurality of overlapping, multidirectional reinforcing strands positioned in at least one annular sheet of netting material to provide openings between the strands comprising the steps of:

(1) retaining said sheet in a shaping apparatus having an annular shaping member with a shaping surface conforming to the shape of at least a portion of said tire and moving said sheet into shaping engagement with said annular shaping surface;

(2) shaping said sheet at an elevated temperature;

(3) placing said shaped sheet on a collapsible core member within a mold and closing an outer shell of a mold around said core member;

(4) filling the cavity between said core member and said outer shell by injecting a liquid reaction mixture of elastomer forming material and flowing said mixture through said openings, reacting said mixture and at least partially curing said mixture;

(5) opening said outer shell of said mold for removal of said tire from said mold;

(6) finally curing said tire; and (7) removing said collapsible core member from said tire.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
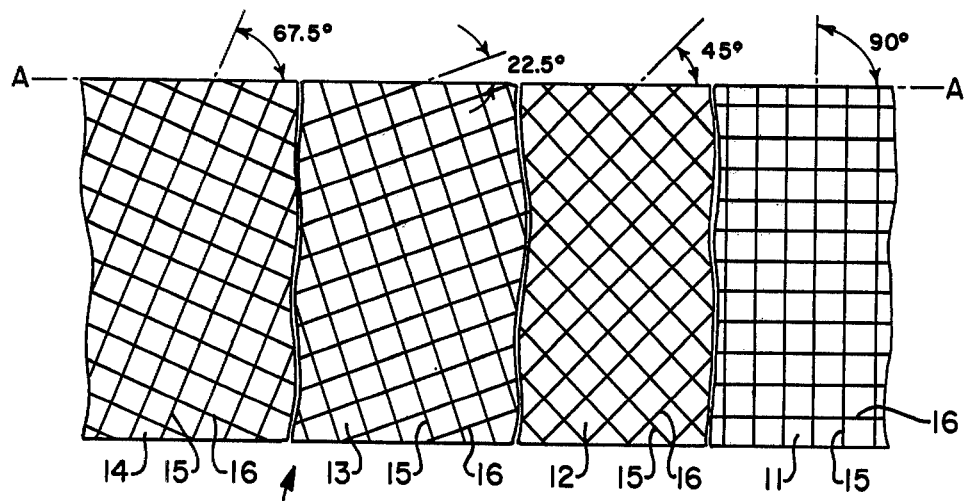
FIG. 1 is a schematic plan view of a reinforcing mat of overlapping sheets of netting material with parts being broken away to show the orientation of the strands in each of said sheets.
Figure 2:
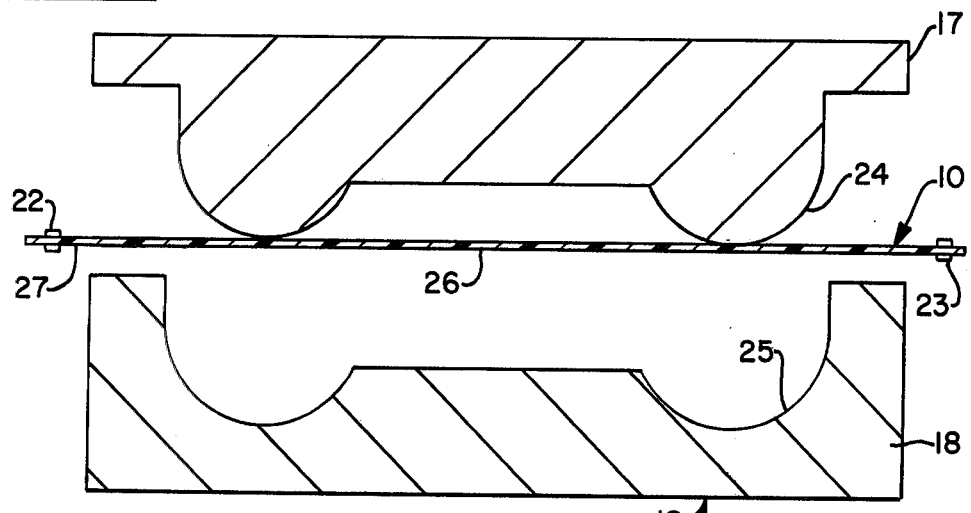
FIG. 2 is a fragmentary schematic cross-sectional view of the annular shaping mechanism in the open position with the mat of netting material sheets in position between the shaping members.

Referring to FIGS. 1 and 2, a tire reinforcing member such as reinforcing mat 10 is shown before shaping. The mat 10 is made from overlapping sheets 11, 12, 13 and 14 of netting material. Each of the sheets 11 through 14 has reinforcing strands 15 extending in one direction and strands 16 extending in a direction at right angles to the direction of the strands 15. The strands 15 and 16 intersect at spaced-apart distances of at least $\frac{1}{8}$ inch (0.32 centimeters) and in the present example are spaced apart $\frac{1}{4}$ inch (0.64 centimeters). The netting material of the sheets 11 through 14 may be thermoplastic such as polypropolene and the netting material made so that the strands 15 and 16 are thermally bonded together during the manufacture of the material.

As shown in FIG. 1, the sheets of netting material 11 through 14 in the mat 10 are positioned so that the strands 15 and 16 are multidirectional to provide homogeneous stress distribution in the tire. For example, the strands 15 in the sheets 11 through 14 are at angles of 90 degrees, 45 degrees, 22½ degrees and 67½ degrees to an edge A—A of the mat 10. Preferably the minimum angle between corresponding strands 15 or 16 of any of the sheets 11 through 14 is 90 degrees divided by the number of overlapping sheets in the mat 10. In the present case, there are four sheets and the minimum angle is 22½ degrees.

Figure 3:
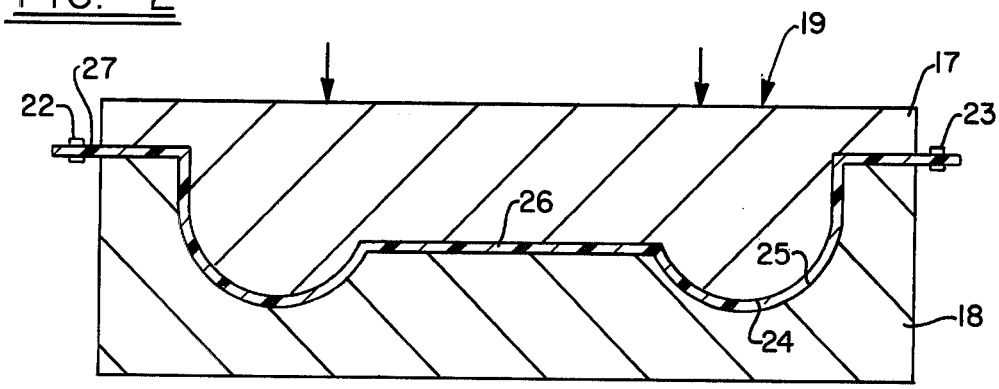
FIG. 3 is a sectional view like FIG. 2 but showing the shaping mechanism in the closed position with the mat of netting material after shaping.

In accordance with this invention, the mat 10 is shaped by placing the mat between shaping members 17 and 18 of a suitable shaping mechanism such as a press 19 in which the mat can be heated and pressed into an annular shape corresponding to the shape of a portion of the tire. Gripping means such as clamps 22 and 23 hold the mat 10 at the edges so that it may be heated and then pressed into shape. In this embodiment, the mat 10 is heated to about 250° C. to 300° C. and then shaped for a period of about 10 minutes, as shown in FIG. 3. The shaping members 17 and 18 have shaping surfaces 24 and 25, respectively, which conform with the shape of a portion of the tire to be reinforced. During the shaping of the mat 10, the strands 15 and 16 are stretched; however, the direction of stretch further orients the strands at elevated temperatures to increase the effective reinforcing properties of the strands.

Figure 4:
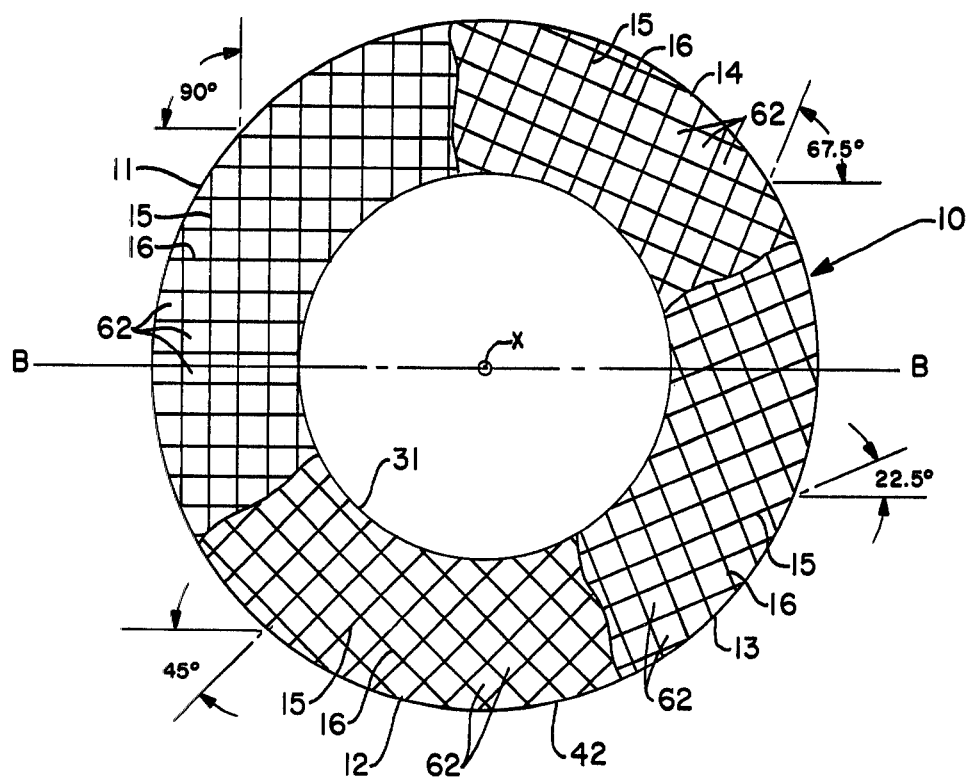
FIG. 4 is a schematic plan view of the shaped mat of netting material sheets with the center section and outer flange removed, parts being broken away to show the orientation of the strands of each sheet.

After the mat 10 has been shaped, it is removed from the shaping apparatus by separating the shaping members 17 and 18 and removing the clamps 22 and 23. Then center portion 26 and peripheral portion 27 of the mat are removed as by cutting or punching to provide the annular shaped configuration shown in FIG. 4. The strands 15 and 16 are in substantially the same orientation and, as shown, strands 15 are generally at an angle of 90 degrees, 45 degrees, 22½ degrees and 67½ degrees relative to a diametrical plane B—B through an axis X—X which corresponds to the axis of the tire. After mat 10 is fabricated, another mat 28 is fabricated in the same manner and these are mounted on a collapsible core member such as core 31.

Figure 5:
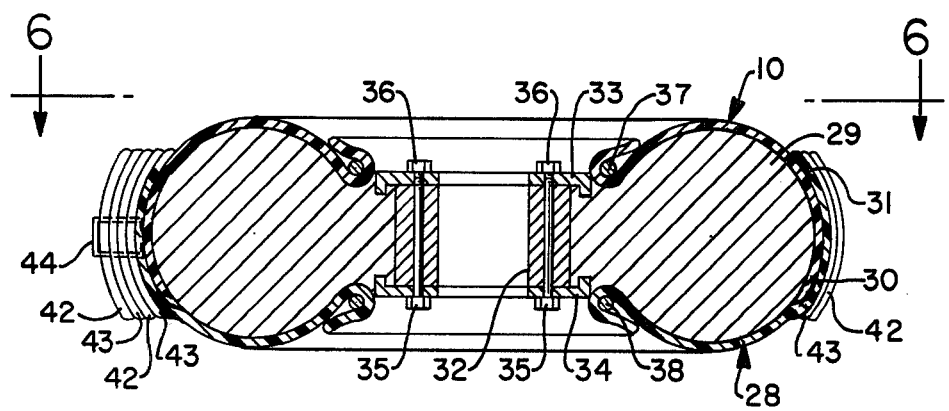
FIG. 5 is a cross-sectional view of the mats and breakers showing the edges of the mats turned over the tire beads and the breakers positioned around the outer periphery of the mats.

As shown in FIG. 5, the mats 10 and 28 are mounted over the core 29 with an outer edge 30 of mat 28 overlapping an outer edge 31 of mat 10.

Figure 6:
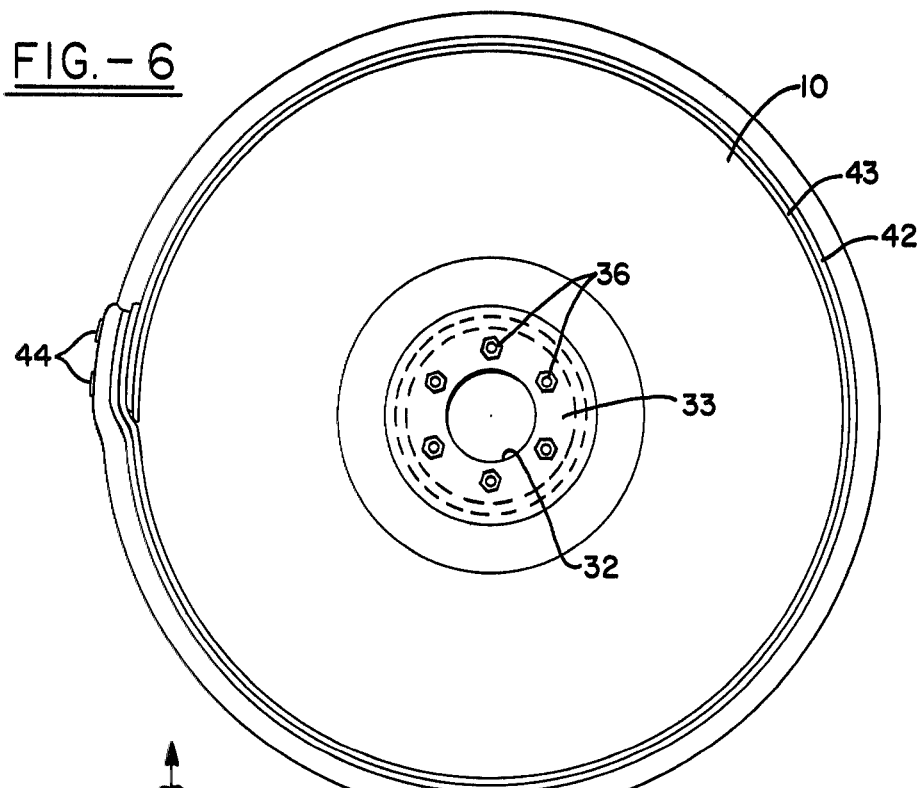
FIG. 6 is a plan view of the assembled mats and breakers taken along the plane of line 6—6 in FIG. 5.
Figure 7:
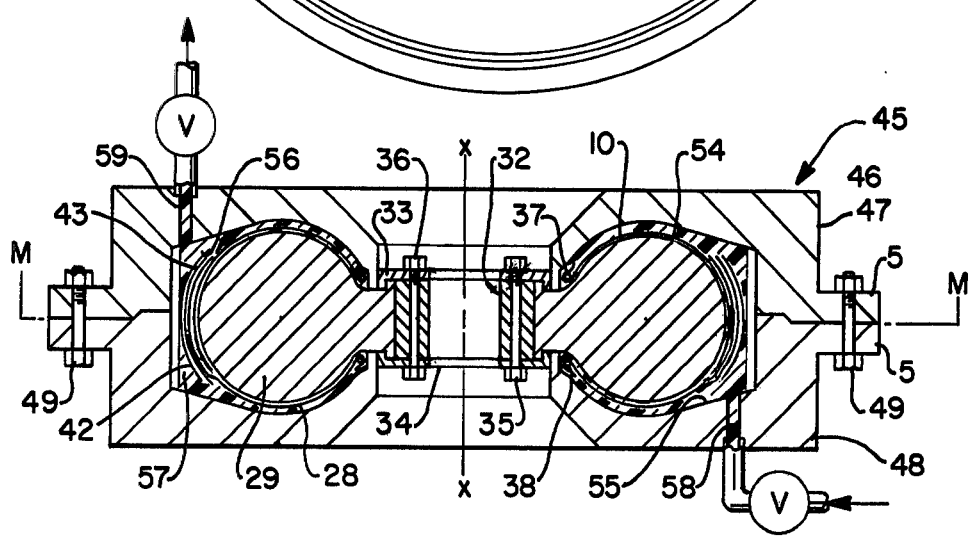
FIG. 7 is a schematic cross-sectional view of the mold and core member showing the tire as molded with two of the mats of netting material sheets and breaker plies in the molded positions.

Referring to FIGS. 5, 6 and 7, the collapsible annular core 29 is shown in the assembled condition with the segments mounted on a cylindrical ring 32. The segments are clamped in position by flanges 33 and 34 fastened to the ring 32 by a plurality of bolts 35 extending through the flanges and ring at spaced-apart positions circumferentially of the ring. Nuts 36 are threaded on the bolts 35 for urging the flanges 33 and 34 into clamping engagement with the ring 32 and the segments of the core 31. In accordance with design practices well known in the mold art, the core 29 may have a plurality of segments arranged so that upon removal of the ring 32 and flanges 33 and 34, the core may be disassembled and pulled out of a tire surrounding the core. As shown in FIGS. 5, 6 and 7 the mats 10 and 28 are positioned around the core 29 with the radially inner edges folded over substantially inextensible annular bead rings 37 and 38, respectively.

After the mats 10 and 28 with the bead rings 37 and 38 are placed around the core 29, a circumferentially extending breaker member having elongated breaker plies 42 and 43 is placed in overlapping relation to the mats with the edges of the circumferentially extending breaker plies extending axially outward on both sides of the midcenter plane M—M. The breaker plies 42 and 43 may also be made of the same construction as the mats 10 and 28 with laminated sheets of netting; however, the breaker plies need only be heated to obtain a curvature equivalent to the outer diameter of the core 29 and then cooled. As shown in FIGS. 5 and 6, the ends of the breaker plies 42 and 43 overlap and may be fastened together by suitable means such as a heat seal, an adhesive or mechanical fasteners such as staples 44. This will not only retain the breaker plies in position but hold the edges 30 and 31 of mats 10 and 20 together. If desired, the edges 30 and 31 may be fastened together before adding the breaker plies 42 and 43 by suitable means such as an adhesive, a heat seal or mechanical fasteners. This may also be done where no breaker plies are needed.

After positioning the mats 10 and 28 with the bead rings 37 and 38 on the core 29 and then placing the breaker plies 42 and 43 in position over the radially outer edges 30 and 31 of the mats, the core with the mats and breaker ply may be placed in an annular rigid mold 45 which may be adapted for injection molding. The mold 45 also has an outer shell 46 including two mold sections 47 and 48 held together by bolts and nuts 49 extending through flanges 52 and 53, respectively, at circumferentially spaced positions around the mold.

Figure 8:
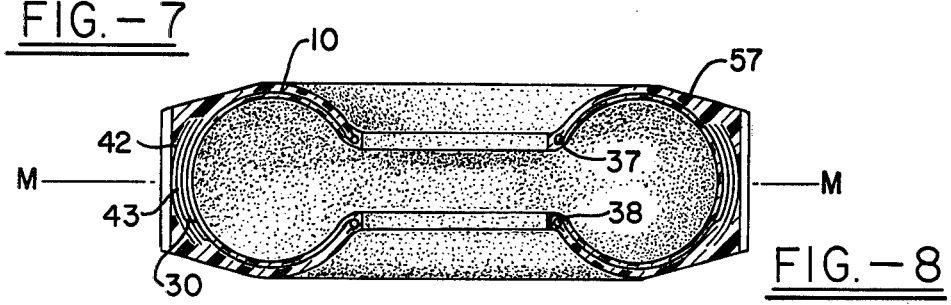
FIG. 8 is a sectional view of the molded tire having a U-shaped cross section after removal from the mold and core.

Between an outer surface 54 of the core 31 and an inner molding surface 55 of the outer shell 46 is provided a cavity 56 for receiving a liquid reaction mixture of elastomer forming material to form a tire 57, shown in the molded condition in the mold in FIG. 7 and out of the mold in FIG. 8. An inlet opening 58 is provided in mold section 48 and an outlet opening 59 is provided in the other mold section 47 at a position spaced from the inlet opening. The liquid reaction mixture of elastomer forming material may be injected through the inlet opening 58 and the mold may be vented or a vacuum applied at the outlet opening 59.

The tire 57 may be made by a suitable molding method such as injection molding a liquid reaction mixture and curing it to form a suitable polyurethane composition having a hardness in the range of from 60 Shore A to 50 Shore D and preferably of about 60 Shore A to 100 Shore A. The polyurethane can be prepared by methods well known to those having skill in the art such as, for example, by forming a liquid reaction mixture of and reacting (A) a polymeric polyol, such as a polyester polyol or polyether polyol, having a molecular weight in the range of about 700 to about 10,000 and an average hydroxyl group functionality in the range of about 2 to about 2.3, (B) a slight stoichiometric excess of organic polyisocyanate having an average isocyanate (NCO) functionality in the range of about 2 to 2.3, and (C) chain extending or curing with a diamine or monomeric polyol containing an average of 2 to 2.3 hydroxyl groups. Generally, the polyurethane can be formed by any of the well known prepolymer, quasi-prepolymer or one-shot methods. Usually the prepolymer or quasi-prepolymer method is preferred in which a product of reacting (A) and (B) is mixed with a curative (C) to form a reaction mixture.

The tire 57 after injection into the cavity 56 is maintained at an elevated temperature of about 250° F. (121° C.) for a period of a few minutes to several hours to at least partially cure the tire.

During injection, the liquid reaction mixture flows through openings 62 in the sheets 11 through 14 of the mats 10 and 30 and the breaker ply 44 which are defined by the strands 15 and 16. This flow of the mixture results in a complete surrounding of the strands 15 and 16 so that in the molded condition the strands are encapsulated. The mixture also flows into the interstices in the strands 15 and is adhered thereto.

It may be desirable to remove the tire 57 from the mold 45 and place it in a heated curing chamber (not shown) before it is completely cured. In that event, the mold configuration is such that the mold sections 47 and 48 can be removed without damaging the tire. The tire 57 is then contained in the chamber at substantially the same curing temperatures for a period of time from a few minutes to several hours until the tire is completely cured. The tire 57 is then removed from the chamber and cooled to room temperature. The elastomeric material formed in the inlet opening 58 and outlet opening 59 may be cut off or otherwise removed.

The core 29 which is segmented may be removed from the tire 57 after removal from the mold 45. The core 29 may then be reassembled on the ring 32 so that another set of reinforcing mats 10 and 28 and breaker plies 42 and 43 may be assembled with the bead rings 37 and 38 on the core prior to placing the assembly in the mold 45.

In the description of this invention, polyurethanes are described and indeed preferred. Such chemistry is generally known to those having skill in the art. Generally the polyurethane precursors are provided as a liquid reaction mixture which is cast and cured in the mold. The liquid reaction mixture is generally of the conventional prepolymer, quasi-prepolymer or one-shot method. Ingredients for the polyurethanes are conventionally polymeric polyols, polyisocyanates and a diamine or monomeric polyol, usually a diol, curative. A small amount of organic solvent is used, as necessary, as a carrier; however, for this invention, it is preferred that the solvent is not used at all. The polymeric polyols are typically polyester or polyether polyols having a molecular weight in the range of about 700 to about 10,000.

In the practice of this invention, it is preferred that the polymeric polyol have a hydroxyl functionality of about 2 in order to enhance the elastomeric characteristic of the polyurethane. The polyurethane is prepared with a slight excess of isocyanate so that the diamine or diol, preferably a diamine curative can react therewith to perform the necessary crosslink or extension.

Injection and pouring of the liquid elastomer forming material has been described hereinabove. It is understood this includes other charging methods where the mold is charged with a measured amount of material under pressure or by gravity flow.

While a certain representative embodiment and details have been shown for the purpose of illustrating the invention, it will be apparent to those skilled in the art that various changes and modifications may be made therein without departing from the spirit and scope of the invention.

We claim:

1. A tire of the type which is cast or injection molded comprising an annular body of elastomeric material having a U-shaped cross section, a pair of radially inner edges of said body, a crown portion, a pair of sidewalls extending radially outward from said inner edges and connected to said crown portion, overlapping, multidirectional reinforcing strands positioned in at least one of said sidewalls to define openings between said strands for striking through of elastomer forming material during molding to provide encapsulation of said strands and interlocking with said annular body.

2. The tire of claim 1 wherein said reinforcing strands are part of at least one annular sheet of netting material shaped to conform to the shape of the annular body of said tire.

3. The tire of claim 2 wherein said strands of said sheet of netting material extend in two directions with one of said directions being at substantially right angles to the other of said directions.

4. The tire of claim 2 wherein said reinforcing strands are positioned in at least one mat of overlapping sheets of netting with said strands of said mat being in nonparallel, multidirectional relationship to provide homogeneous stress distribution upon inflation and operation of the tire.

5. The tire of claim 2 wherein said annular sheet of reinforcing strands extends from one of said inner edges to said crown portion.

6. The tire of claim 4 wherein said multidirectional relationship of said strands in such that the minimum angle between strands of adjacent sheets is equal to 90 degrees divided by the number of overlapping sheets in said mat.

7. The tire of claim 6 wherein there are four of said overlapping sheets in said mat and the strands of said different sheets are at angles of 22½ degrees, 45 degrees, 67½ degrees and 90 degrees to a diametrical plane extending through the axis of said tire.

8. The tire of claim 2 wherein said strands of said annular sheet of netting intersect at positions spaced apart a distance of at least one-eighth inch.

9. The tire of claim 1 wherein said strands are preshaped by stretching and orientation before placing said strands in said mold and said annular body is molded by injecting a liquid reaction mixture of elastomer forming material into a mold.

10. The tire of claim 5 wherein a second annular sheet of reinforcing strands extends from the other one of said inner edges to said crown portion and wherein the radially outer edges of said first-mentioned sheet and said second sheet are fastened together.

11. The tire of claim 10 wherein said first-mentioned sheet and said second annular sheet are fastened together by a breaker member positioned in said crown portion in overlapping relation to said first-mentioned sheet and said second annular sheet of netting material.

12. The tire of claim 11 wherein said first-mentioned reinforcing sheet of netting material and said second annular sheet of netting material terminate short of the midcenter plane of said tire and said breaker member extends axially outward on both sides of said midcenter plane of said tire.

13. The tire of claim 1 wherein said strands of said netting material are of a thermoplastic material and are shaped at an elevated temperature and then cooled before placing in said mold.

14. The tire of claim 2 including annular bead rings at said inner edges and said sheet of netting material having a portion folded over one of said bead rings.

15. The tire of claim 14 wherein said netting material is of polypropylene and said strands of netting are heated to a temperature of about 250° C. to 300° C. to shape said sheet of reinforcing material.

16. A process for reinforcing a tire with a plurality of overlapping, multidirectional reinforcing strands positioned in at least one annular sheet of netting material to provide openings between the strands comprising the steps of:

(1) retaining said sheet in a shaping apparatus having an annular shaping member with a shaping surface conforming to the shape of at least a portion of said tire and moving said sheet into shaping engagement with said annular shaping surface;

(2) shaping said sheet at an elevated temperature;

(3) placing said shaped sheet on a collapsible core member within a mold and closing an outer shell of a mold around said core member;

(4) filling the cavity between said core member and said outer shell by injecting a liquid reaction mixture of elastomer forming material and flowing said mixture through said openings, reacting said mixture and at least partially curing said mixture;

(5) opening said outer shell of said mold for removal of said tire from said mold;

(6) finally curing said tire; and (7) removing said collapsible core member from said tire.

17. The process of claim 16 wherein said sheet of netting material is of thermoplastic material and said sheet is heated before moving of said sheet into shaping engagement with said shaping surface and thereafter said sheet is cooled after shaping.

18. The process of claim 16 wherein said sheet of netting material is heated to a temperature below the melting point of said netting material and cooled to room temperature.

19. The process of claim 16 wherein a center portion of said sheet is removed after shaping to provide an annular sheet for placing over said core member.

20. The process of claim 16 wherein said strands are positioned in two mats of overlapping annular sheets of netting material with each of said mats being placed on said core member and extending part way across said tire and including the step of fastening the edges of said two mats of annular sheets together.

21. The process of claim 20 wherein said edges of said mats are fastened together by positioning an annular breaker member of reinforcing material in overlapping relation to said mats.

22. The process of claim 16 wherein said mixture is injected into said cavity through an inlet in said mold and simultaneously a vacuum is applied at an outlet in said mold spaced from said inlet.

23. The process of claim 16 wherein said reinforcing strands are positioned in at least one mat of overlapping sheets of netting material with each of said sheets having strands extending in two directions at right angles and said strands of each of said sheets being in nonparallel, angular relationship to the strands of the other sheets of said mat to provide even stress distribution upon inflation and operation of the tire.

24. The process of claim 23 wherein said angular relationship of said strands is such that the minimum angle between strands of adjacent sheets in said mat is equal to 90 degrees divided by the number of overlapping sheets.

25. The process of claim 23 wherein four of said overlapping sheets in said mat are laid up and the strands of said sheets are positioned at $22\frac{1}{2}$ degrees, 45 degrees, $67\frac{1}{2}$ degrees and 90 degrees to an edge of one of said sheets.

26. The process of claim 16 wherein said tire has reinforcing annular bead rings and said sheet is folded around one of said bead rings prior to placing of said strands on said core member.

27. The process of claim 26 wherein said tire has a crown portion and said sheet is positioned on said core member to extend from said one of said bead rings to said crown portion.

28. The process of claim 20 wherein said tire has a pair of reinforcing bead rings and the strands of each of said mats of reinforcing sheets are folded around one of said pair of bead rings prior to placing of said mats on said core member.

* * * * *